United States Patent
Talukdar et al.

(10) Patent No.: US 10,959,170 B2
(45) Date of Patent: Mar. 23, 2021

(54) MILLIMETER WAVE ACCESS POINT STATES IN A CLUSTER SET

(71) Applicant: Nokia Technologies Oy, Espoo (FI)

(72) Inventors: Anup Talukdar, Glendale Heights, IL (US); Mark Cudak, Rolling Meadows, IL (US); Ahmad Awada, Munich (DE); Andreas Maeder, Würzburg (DE)

(73) Assignee: Nokia Technologies Oy, Espoo (FI)

( * ) Notice: Subject to any disclaimer, the term of this patent is extended or adjusted under 35 U.S.C. 154(b) by 157 days.

(21) Appl. No.: 15/768,911

(22) PCT Filed: Nov. 4, 2015

(86) PCT No.: PCT/US2015/058962
§ 371 (c)(1),
(2) Date: Apr. 17, 2018

(87) PCT Pub. No.: WO2017/078691
PCT Pub. Date: May 11, 2017

(65) Prior Publication Data
US 2018/0288674 A1    Oct. 4, 2018

(51) Int. Cl.
| | |
|---|---|
| *H04W 48/20* | (2009.01) |
| *H04W 36/00* | (2009.01) |
| *H04W 76/27* | (2018.01) |
| *H04W 48/02* | (2009.01) |
| *H04W 48/12* | (2009.01) |
| *H04W 48/16* | (2009.01) |
| *H04W 88/08* | (2009.01) |

(52) U.S. Cl.
CPC ....... *H04W 48/20* (2013.01); *H04W 36/0083* (2013.01); *H04W 48/02* (2013.01); *H04W 48/12* (2013.01); *H04W 48/16* (2013.01); *H04W 76/27* (2018.02); *H04W 88/08* (2013.01)

(58) Field of Classification Search
CPC ..... H04W 76/27; H04W 52/28; H04W 48/00; H04W 48/20; H04W 88/08
See application file for complete search history.

(56) References Cited

U.S. PATENT DOCUMENTS

| 9,648,616 B2 | 5/2017 | Talukdar et al. |
| 2013/0223340 A1 | 8/2013 | Jeong |
| (Continued) | | |

FOREIGN PATENT DOCUMENTS

| EP | 2 749 105 | 2/2014 |
| WO | 2014/009246 A1 | 1/2014 |
| WO | 2016/113172 A1 | 7/2016 |

OTHER PUBLICATIONS

Office action received for corresponding European Patent Application No. 15798273.7, dated Aug. 2, 2019, 3 pages.
(Continued)

*Primary Examiner* — Ashley Shivers
(74) *Attorney, Agent, or Firm* — Harrington & Smith

(57) ABSTRACT

A method including determining a plurality of access points (APs) to be used in an access point cluster set (CS) for a user device (UD); and for at least one of the plurality of access points (APs), assigning an access point availability state from a plurality of possible access point availability states, where the plurality of possible access point availability states includes a suspended state.

20 Claims, 6 Drawing Sheets

(56) References Cited

U.S. PATENT DOCUMENTS

2016/0261424 A1* 9/2016 Gamberini ............ H04L 67/125
2016/0323781 A1* 11/2016 Yang ..................... H04W 24/08

OTHER PUBLICATIONS

Cudak et al., "Moving Towards Mmwave-Based Beyond-4G (B-4G) Technology", IEEE 77th Vehicular Technology Conference (VTC Spring), Jun. 2-5, 2013, 5 pages.
Talukdar et al., "Handoff Rates for Millimeterwave 5G Systems", IEEE 79th Vehicular Technology Conference (VTC Spring), May 18-21, 2014, 5 pages.
"3rd Generation Partnership Project; Technical Specification Group Radio Access Network; Coordinated multi-point operation for LTE physical layer aspects (Release 11)", 3GPP TR 36.819, V11.2.0, Sep. 2013, pp. 1-70.
International Search Report and Written Opinion received for corresponding Patent Cooperation Treaty Application No. PCT/US2015/058962, dated Jul. 12, 2016, 11 pages.

* cited by examiner

MILLIMETER WAVE ACCESS POINT STATES IN A CLUSTER SET

RELATED APPLICATION

This application was originally filed as PCT Application No. PCT/US2015/058962 on Nov. 4, 2015.

BACKGROUND

Technical Field

The exemplary and non-limiting embodiments relate generally to wireless communication and, more particularly, to communication using an access point.

Brief Description of Prior Developments

A user device (UD) is able to communicate with a wireless network by use of an access point (AP). It is known to provide a cluster set (CS) of access points for a user device to communicate with the network.

SUMMARY

The following summary is merely intended to be exemplary. The summary is not intended to limit the scope of the claims.

In accordance with one aspect, an example method comprises determining a plurality of access points (APs) to be used in an access point cluster set (CS) for a user device (UD); and for each of the plurality of access points (APs), assigning an access point availability state from a plurality of possible access point availability states, where the plurality of possible access point availability states includes a suspended state.

In accordance with another aspect, an example apparatus comprises at least one processor; and at least one non-transitory memory including computer program code, the at least one memory and the computer program code configured to, with the at least one processor, cause the apparatus to: determine a plurality of access points (APs) to be used in an access point cluster set (CS) for a user device (UD); and for each of the plurality of access points (APs), assign an access point availability state from a plurality of possible access point availability states, where the plurality of possible access point availability states include a suspended state.

In accordance with another aspect, an example embodiment is provided in a non-transitory program storage device readable by a machine, tangibly embodying a program of instructions executable by the machine for performing operations, the operations comprising: determining a plurality of access points (APs) to be used in an access point cluster set (CS) for a user device (UD); and for each of the plurality of access points (APs), assigning an access point availability state from a plurality of possible access point availability states, where the plurality of possible access point availability states include a suspended state.

In accordance with another aspect, an example apparatus comprises at least one processor; and at least one non-transitory memory including computer program code, the at least one memory and the computer program code configured to, with the at least one processor, cause the apparatus to: be used in an access point cluster set (CS) for a user device (UD); and be assigned an access point availability state from a plurality of possible access point availability states, where the plurality of possible access point availability states comprise a suspended state.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
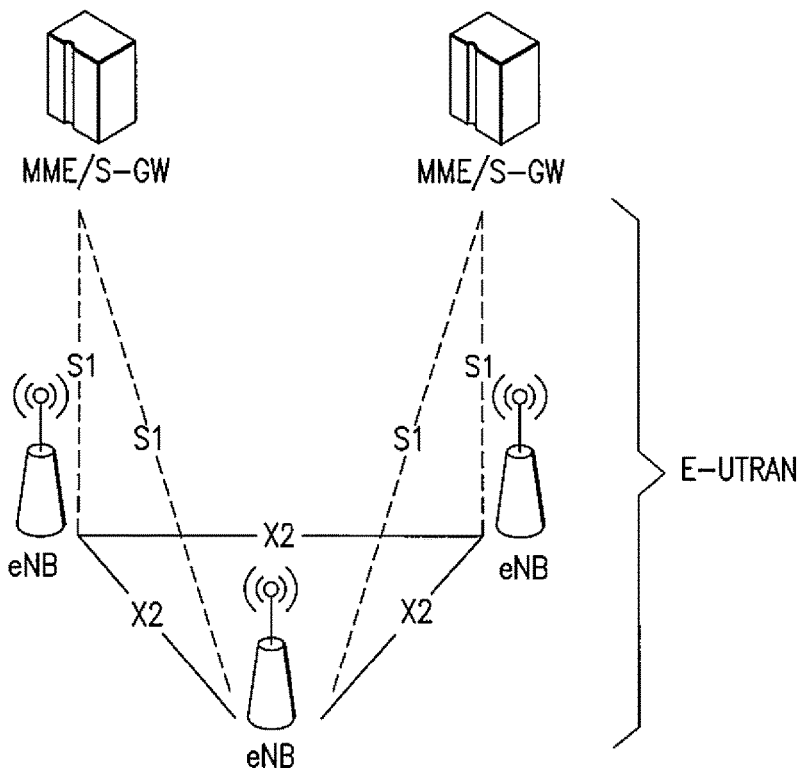
FIG. 1 is a diagram illustrating an example of an overall architecture of a E-UTRAN (evolved UMTS Terrestrial Radio Access) system (an air interface of 3GPP's Long Term Evolution (LTE) upgrade path for mobile networks)

The following abbreviations that may be found in the specification and/or the drawing figures are defined as follows:

3 GPP Third Generation Partnership Program
AP Access Point
ACK Acknowledgement
ARQ Automatic Repeat Request
CSI Channel State Information
CSM Cluster Set Manager
DL Downlink
DTX Discontinuous Transmission
eNB enhanced Node B (base station according to LTE terminology)
E-UTRAN E-Universal Terrestrial Radio Access Network
LOS Line Of Sight
LTE Long-Term Evolution
mmWave Millimeter wave
NACK Negative acknowledgement
NLOS Non-Line of Sight
RACH Random Access CHannel
SINR Signal-to-Interference and Noise Ratio
SNR Signal-to-Noise Ratio
TDD Time division duplex
UD User Device
UL Uplink FIG. 1 shows an example of overall architecture of an E-UTRAN system. The E-UTRAN system includes eNBs, providing an E-UTRAN user plane (PDCP/RLC/MAC/PHY) and control plane (RRC) protocol terminations towards the UD (not shown in FIG. 1). The eNBs are interconnected with each other by means of an X2 interface. The eNBs are also connected by means of a S1 interface to an EPC (Enhanced Packet Core), more specifically to an MME (Mobility Management Entity) by means of an S1 MME interface and to a Serving Gateway (S-GW) by means of an S1 interface. The S1 interface supports a many-to-many relationship between MMEs/S-GW and eNBs. One or more of the eNB may form an access point (AP) for a MillimeterWave (mmWave) frequency bands, or the mmWave APs may be otherwise connected to the network shown in FIG. 1. Alternatively, the mmWave APs may form their own network, separate from the network shown in FIG. 1; perhaps connected to the network shown in FIG. 1 by a MME/S-GW for example.

Figure 2:
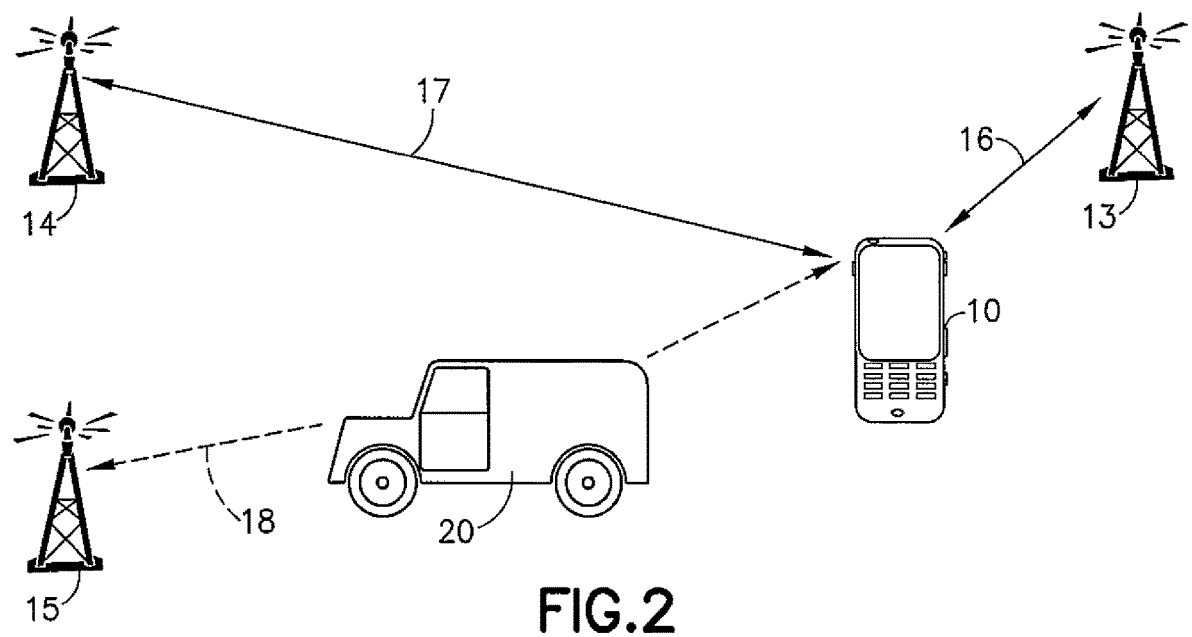
FIG. 2 is a diagram illustrating a user device in a network of access points, where communication between the user device and one of the access points is blocked by an object.

Referring also to FIG. 2, a user device (UD) 10 is shown. In this example the UD 10 is a smartphone. However, in alternate examples the UD may be, for example, a tablet computer, a PDA, a smart watch, or any other suitable device configured for wireless communications including, for example, in a vehicle such as a car. The UD 10 is configured to be able to communicate with the access points (APs) 13, 14, 15 by MillimeterWave (mmWave) frequency bands as illustrated by possible links 16, 17, 18 shown in FIG. 2.

Figure 3:
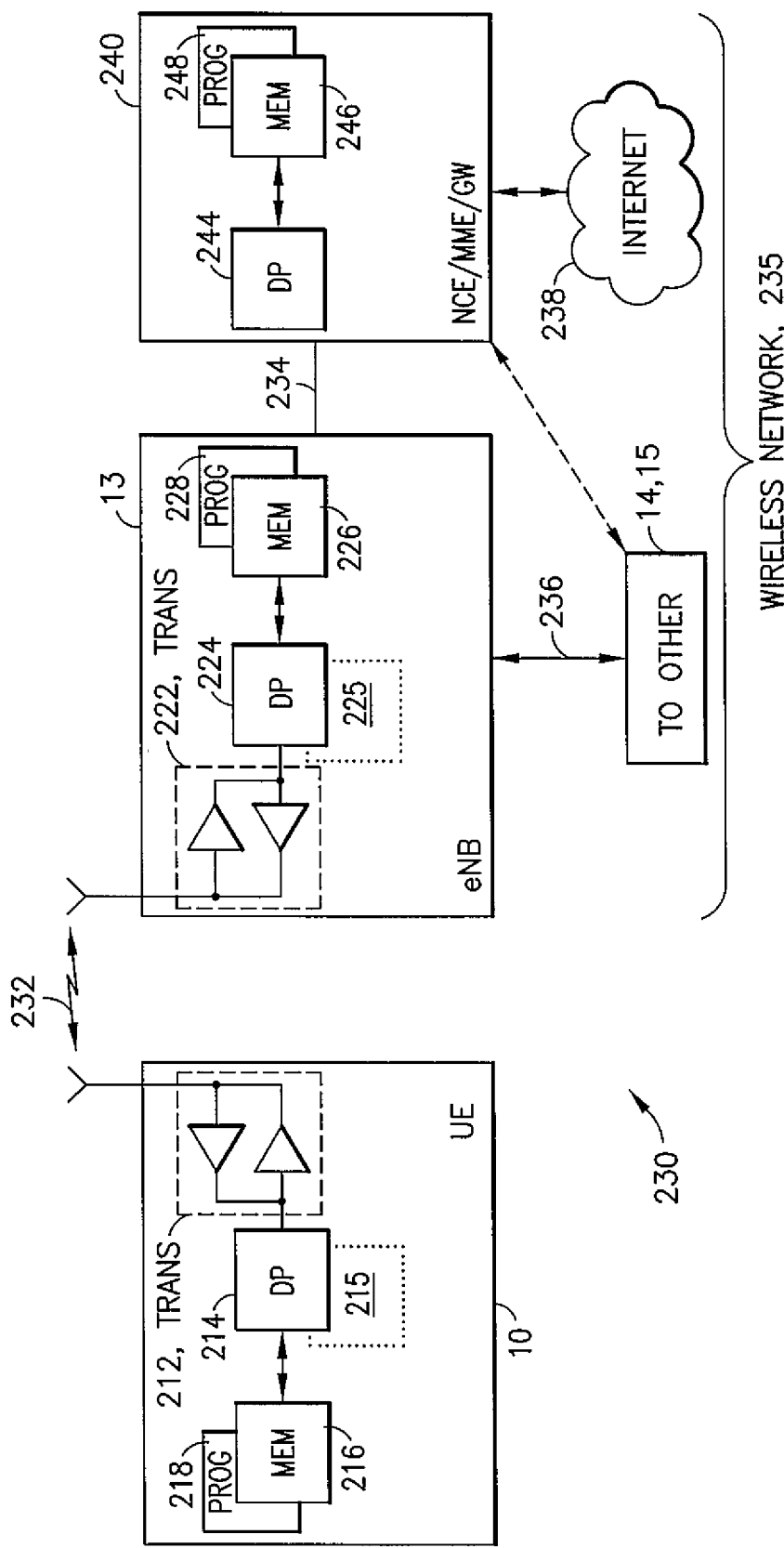
FIG. 3 is a diagram illustrating some components of the wireless system shown in FIGS. 1 and 2.

Referring also to FIG. 3, in the wireless system 230 a wireless network 235 is adapted for communication over a wireless link 232 with an apparatus, such as a mobile communication device which may be referred to as a UD 10, via a network access node or access point (AP) 13. The network 235 may include a network control element (NCE) 240 that may include MME/S-GW functionality, and which provides connectivity with a network, such as a telephone network and/or a data communications network (e.g., the internet 238). In the example 5G mmWave system shown, the APs will be inter-connected among themselves. A few the APs, designated as egress APs, will be connected to the NCE/MME/GW 240.

The UD 10 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the AP 13 via one or more antennas.

The AP 13 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UD 10 via one or more antennas. The AP 13 is coupled via a data/control path 234 to the NCE 240. The path 234 may be implemented as an interface. The AP 13 may also be coupled to other APs and perhaps eNB(s) via data/control path 236, which may be implemented as an interface.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail. That is, various exemplary embodiments of this invention may be implemented at least in part by computer software executable by the DP 214 of the UD 10; by the DP 224 of the AP 13; and/or by the DP 244 of the NCE 240, or by hardware, or by a combination of software and hardware (and firmware).

For the purposes of describing various exemplary embodiments in accordance with this invention the UD 10 and the AP 13 may also include dedicated processors, for example RRC module 215 and a corresponding RRC module 225. RRC module 215 and RRC module 225 may be constructed so as to operate in accordance with various exemplary embodiments in accordance with this invention.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

5th Generation (5G) wireless networks are being designed to deliver peak data rates of the order of about 10 Gbps, and the target latency requirements have been set to the order of about 1 msec in order to serve applications with ultra-low latency performance requirements. The availability of large blocks of contiguous spectrum of the order of several gigahertzes in the millimeter-wave (mmWave) band makes it a promising candidate for $5^{th}$ generation (5G) cellular technology. Spectrum in traditional cellular bands (below 6 GHz) is finite and, as cellular data traffic demand continues to grow, new frequency bands must be considered. Unlike traditional cellular bands, large blocks of contiguous spectrum may be allocated at mmWave bands allowing for bandwidths on the order of several gigahertzes. Moreover, the mmWave bands allow for multi-element antenna arrays composed of very small elements, such as on the order of IC chip scales for example, providing large antenna gain and sufficient power output through over-the-air power combining. This combination of large bandwidths and novel device architectures allows mmWave cellular to provide peak rates on the order of 10 Gbps and ample capacity to meet future data traffic demands.

However, the propagation characteristics in the mmWave band are more challenging than traditional cellular in lower frequencies. Diffraction at mmWave bands is effectively non-existent and propagation behaves similar to visible light. Transmission through most objects is diminished where foliage and other common obstacles can produce severe shadowing. Reflective power, on the other hand, is improved offering new opportunities for completing the link, but may be 15 dB-40 dB weaker. In a typical urban deployment, mmWave access points (AP) are expected to be installed on top of street-side poles, possibly at street corners. Other deployment scenarios are stadiums, college campus courtyards and tourist hotspots.

The severe shadowing loss characteristics in the mmWave band implies that the radio link between a user device (UD) and its serving access point (AP) will be disrupted if the line-of-sight (LOS) is blocked by obstacles, such as trees, pedestrians or trucks in an urban deployment. An example of this is shown in FIG. 2, where the link 18 between the UD 10 and the AP 15 is blocked by the truck 20. In a campus courtyard or a tourist hotspot LOS blocking may be caused by crowds. Other types of LOS blocking may be caused by user motions such as hand or body rotations. In order to deliver reliable connectivity to a user in presence of obstacles, a mmWave access point network should be built with enough redundancies of APs such that, in the event of a LOS blocking, the network connection of the UD can be rapidly rerouted via another AP. For example, in FIG. 2 the APs 13 and 14 are other APs which can be used by the UD 10 when the line-of-sight (LOS) between the UD 10 and the AP 15 is blocked by the truck 20. The LOS between the UD 10 and the APs 13, 14 is not blocked and, thus, the possible links 16, 17 are potentially available. Note that the term AP is interchangeable with terminology used in mobile communication standards such as base station (BS), NodeB in 3GPP, eNB, etc. The same holds for UD, which is interchangeable with the terms user equipment (UE), or mobile station (MS), or other common terms.

Each UD in a mmWave network may be served by a cluster of APs, called its cluster set (CS). Members of the cluster set of a UD are initially selected based on the accessibility of the APs from the UD. An AP is accessible to a UD if the UD can receive the beacon waveform from the AP, (which can be a broadcast beacon or a swept beam beacon for example), above a certain SNR threshold, and/or the AP can receive the beacon waveform from the UD above a certain SNR threshold. The accessibility information between an AP and a UD may consist of the best transmit and receive antenna beam weights and the signal strengths of those beams. In FIG. 2, APs 13, 14, 15 form the cluster set (CS) for the UD 10. Among the APs in the cluster set, one particular AP can be selected as the "serving AP" for the UD; through which the network communicates with the UD. In FIG. 2, AP 13 is the serving AP. The other APs 14, 15 in the cluster set are "stand-by APs". The UD 10 attempts to maintain continuous connectivity with each member AP 13, 14, 15 of its cluster set by maintaining synchronization with the symbol and frame structure, downlink and uplink control channels, and also maintain beam synchronization by selecting best beams for DL and UL communication.

Figure 4:
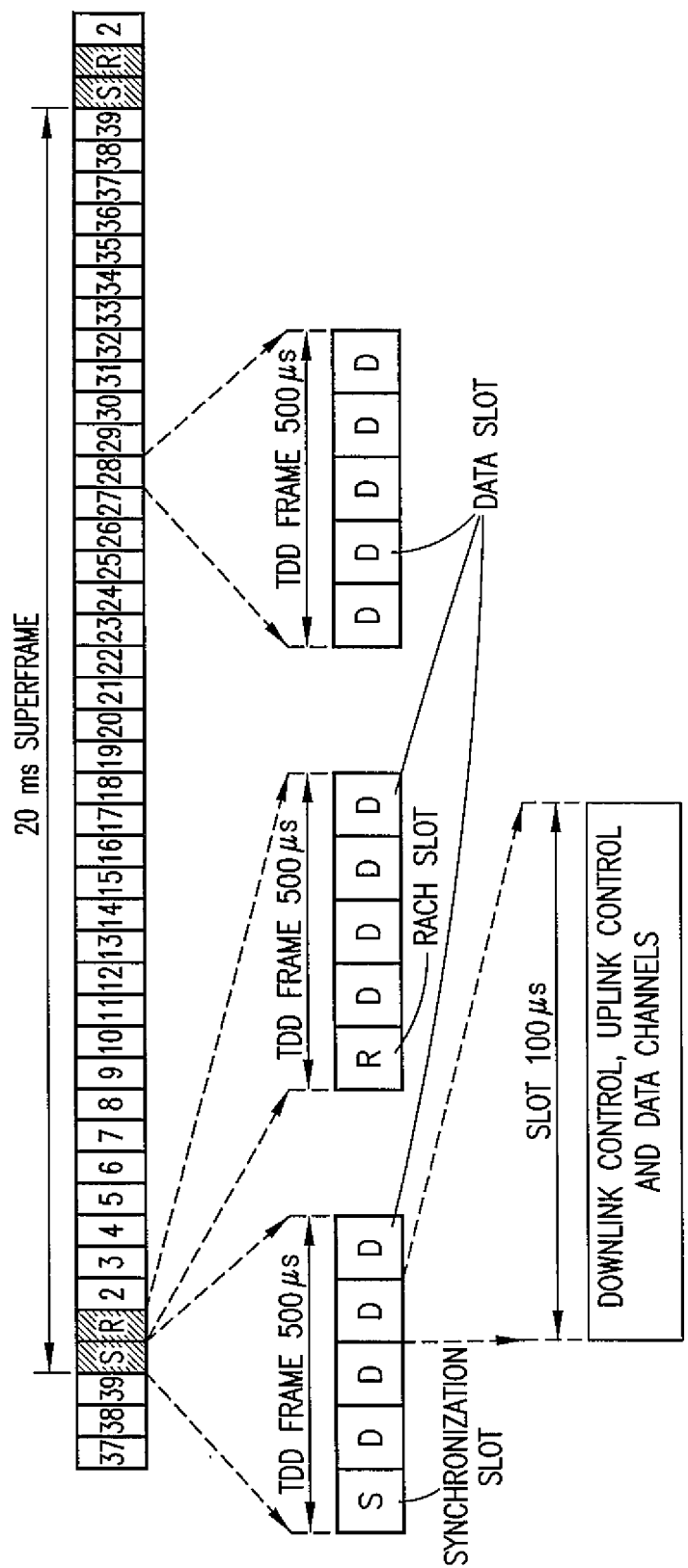
FIG. 4 is a diagram illustrating an example of a mmWave frame structure.

An example of an air-interface frame structure for a mmWave 5G system is shown in 4. In this example structure a 20 msec superframe is subdivided into 40 subframes; each of duration 500 microsec. Each subframe is further divided into five (5) slots of 100 microsec duration. A slot can be a synchronization slot, an uplink random access channel (RACH) or a data slot. In FIG. 4, "R" includes the RACH slot and "S" includes the synchronization slot.

The synchronization (Sync) channel is transmitted over one or more adjacent slots and is used by the UD for system acquisition and also for UD specific beam synchronization. The Sync channel is transmitted every 20 msec and may include a Master Information Block (MIB). The MIB may contain downlink and/or uplink control channel configurations, among other information. The RACH slots(s) can be used by an UD for uplink synchronization, to provide feedback on beam selection, and also to send an uplink resource request. A data slot contains downlink control channels, uplink control channels and data channels for downlink and uplink data transmissions. In order to meet the link budget and maximize efficiency, UD-specific beamforming techniques are used for all communications between and AP and an UD in a data slot. In addition, the use of analog beamforming at the transmitter and receiver requires that the communication channels for different users and access point pairs are time division multiplexed.

Figure 5:
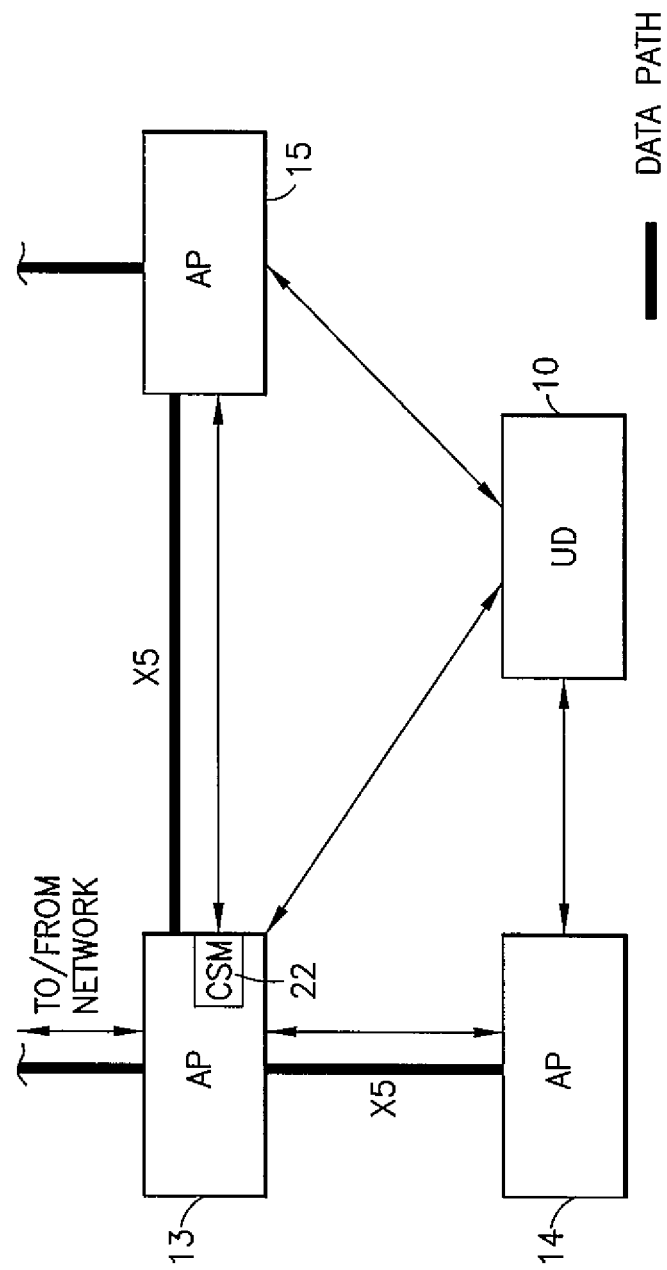
FIG. 5 is a diagram illustrating an example of a cluster set of a user device and its cluster set manager.

In order to deliver low-latency services to a UD, radio resources may need to be allocated for the UD not only in the serving AP, but also in stand-by APs in the cluster set. This allocation is done during the process of cluster set configurations for the UD. For example, to enable rapid rerouting during downlink and uplink data transfer, the UD needs to monitor the downlink control channels of one or more stand-by APs, in addition to the regular monitoring of the serving AP. For this purpose, UDs need to be assigned DL control channels in different APs. For low-latency robust uplink access, UD-specific UL polling channels may need to be allocated in multiple APs of the cluster set The cluster set of an UD is configured and managed by the Cluster Set Manager (CSM) 22 as shown by the example in FIG. 5; there is a logical instance of CSM for each UD and it is located in the network. The location of the CSM should be close to the APs in the cluster set to enable low-latency communication with those APs and the UD. In FIG. 5, the cluster set containing three APs and the cluster set manager (CSM) are shown for the user device 10. Note that the CSM 22 can be located in the Radio Resource Control (RRC) function in 3GPP systems.

As noted above, sometimes an AP in a cluster set may become "blocked". In other words, the wireless link between the UD and the AP in a cluster set is not available due to the presence of obstacles in the line of sight (LOS) between the UD and the AP. When the serving AP of the UD is blocked, the network connection of the UD needs to be rerouted via a stand-by AP in its cluster set, which will become its new serving AP. Also for low-latency robust uplink access, the UD may use the earliest uplink access opportunity available in any of the APs in its cluster set. When selecting an AP for rerouting the radio link or when performing an uplink access, a use of a blocked AP in the cluster set should be avoided. In most cases, radio link blockages are transient phenomena. The radio link is subsequently restored as soon as the obstacle goes away; possibly without significant signal quality degradation. With features as described herein, an AP experiencing a blockage may be suspended from consideration and, once the blockage has been cleared, it may be restored with full functionalities. With features as described herein, the processing of these transient blocking events may be efficient, incurring minimal network overhead for cluster set configuration and management in presence of frequent radio link blockages. In the presence of frequent radio link blockages, an adequate order of AP diversity for a UD at all times may be maintained so that a desired level of reliability and performance of the UD's connectivity can be achieved. Thus, blocked APs (as well as APs with poor channel conditions in the cluster set) may be replaced with APs having good link quality, or at least better link quality, as fast as possible. With features as described herein, the above may be accomplished by maintaining an up-to-date information about the status of the radio link between an UD and the APs. Thus, with features as described herein, managing the radio link status information of the APs for a UD may be addressed.

The problem of radio link blockages arises mainly in systems using mmWave bands. In systems at lower frequencies, the necessity of monitoring the radio link status to multiple base stations does not arise. In existing systems, UEs connect to only one AP at a time. They are not designed to deliver the ultra-low latency performances of 5G. In a CoMP Active Set, data transmission to the user may be via one of the transmission points (TP) in the active set. However, control channel allocation is done only from the serving TP. The TP selection is done based on the channel state information feedback. This strategy does not work for the mmWave 5G system. This is because in the mmWave 5G system the measurement and feedback interval is determined by the synchronization channel (Sync) channel periodicity, which is typically 10 msec or 20 msec, and it is too large compared to the ultra-low latency requirements of the order of ~1 msec in 5G.

The radio link status between an AP and a UD can be determined at the UD and/or at the AP. At the UD, radio link status may be determined by observation of the Sync channel of the AP. The status may be considered as "Detected" if the UD can detect Sync channel above a SINR threshold or the received power on Sync channel is above a certain threshold, otherwise, it may be considered as "Blocked". The observation period may be, for example, one instance of the signal, i.e. there is one observation per super-frame as shown in FIG. 2. The UD may also detect a radio link blockage during uplink access procedure if it does not receive any response from the AP after it sends an uplink access request over the uplink random access channel or uplink polling channel.

At the AP, the radio link status may be determined during downlink and uplink data transfers. For example, the AP may determine a radio link is blocked when it detects DTX (discontinuous transmission) over a feedback channel (such as HARQ feedback channel for downlink data transmission, FastACK channel which carries an acknowledgement for successful reception of downlink or uplink resource allocation by the UD), or the uplink data channel in response to uplink resource allocation to the UD. AP may also determine that the radio link is blocked when it detects DTX in an uplink beacon/control channel over which the UD periodically transmits an uplink beacon signal or a control message.

The availability "status" of an AP with respect to a UD can be broadly classified into either "available" or "unavailable". This may be a qualified determination based on one or more observations of the synchronization channel if the determination is performed by the UD. For example, the status of an AP may be considered "available" if there has been a detection relative to the UD for a sufficiently long amount of time. Some alternative criteria which can be considered for determination of availability, for example, are:
  the AP has been detected M times out of N observations, or
  the AP has been detected at least once in the last N observations periods.

Conversely, as another example, the status of an AP may be considered "unavailable" if the detection relative to the UD has been infrequent for a predetermined amount, or not at all. For example, the following criteria may be used:
  the AP has been detected less than M out of N observations, or
  the AP has not been detected in the last N observation periods.

Similar criteria, as noted above, for determination of the availability status of the radio link can be used for the other types of observations for detection of radio link blockages by the UD and the AP, such as,
  UD determines that the radio link is blocked when it does not receive any reply from the AP in response to its sending an uplink access request over the RACH or uplink polling channel
  AP determines that its radio link to an UD is blocked if it detects a DTX over the FastACK channel in response to sending a resource allocation to the UD or sending a command to the UD over the downlink control channel.
  AP determines that its radio link to an UD is blocked if it detects a DTX over the uplink data channel in response to the allocation of uplink resources to the UD.
  AP determines that its radio link to an UD is blocked if it detects a DTX on the uplink beacon/control channel over which the UD periodically transmits a beacon or control message.

The method for determination of availability of an AP may be implemented using various techniques. For example, a counter $T_{detected}$ may be used to count a number of times the radio link between AP and the UD has been detected within a window of an observation period.

When UD determines the availability status of its radio link to an AP, it refers to the status of the downlink. However, in a Time_Division Duplex (TDD) system, based on the reciprocity of the downlink and uplink propagation characteristics of the radio link, the determined availability status is applicable to the uplink also. For the same reason, although the availability status of the radio link as determined by an AP refers to the uplink from the UD to the AP, it is applicable to the downlink also.

Irrespective of whether the AP or the UD determines the availability status of the radio link, 'availability status of AP' with regard to an UD herein indicates the availability status of the radio link between the AP and the UD.

In one type of example the "availability state" of a radio link between an AP and a UD may be one of:
  When the AP has an available status:
    Available-Selected, or
    Available-Not-Selected
  (dependent upon whether or not the AP is in the CS); or
  When the AP has an unavailable status:
    Unavailable-suspended, or
    Unavailable-Not-Selected
  (dependent upon whether or not the AP is in the CS).

In alternate example embodiments, there may be other "states" designated.

With features as described herein, an "availability state" of a radio link between a AP and a UD is managed by both the UD and the network (such as the AP and/or the CSM). The availability state may be used to capture the transient behavior of the propagation environment in the mmWave band. An AP in a cluster set (CS) is considered to be "unavailable-suspended" (or sometimes merely referred to herein as a "suspended state") if it has been unavailable. An AP in the cluster set (CS) is considered to be "available-selected" (or sometimes merely referred to herein as a "selected state") if it is available. An AP which is in the cluster set (CS), even if it is "unavailable-suspended", might not be fully removed from the cluster set since the "blocked" radio link may be re-established.

When an AP in the cluster set (CS) is unavailable, the AP may be put in a novel state referred to herein as an "Unavailable-Suspended" state. Thus, the AP may be considered a "suspended AP". An AP in the unavailable-suspended state cannot be used for rapid rerouting, and the UD does not use it for uplink access. However, the radio frame resources in the suspended AP allocated/assigned to the UD are not released. Thus, when the radio link for the suspended AP becomes available again for the UD, the AP can be considered again for various rapid rerouting procedures and uplink access without incurring delays and overheads for the cluster set re-configuration. This may be done, for example, by changing the "availability state" of an AP from the "unavailable-suspended" state to a state in which the AP may now be considered for use.

The UD may be able to maintain up-to-date accessibility information for an AP which is available, which may be in the cluster set or not; it may acquire the information from the Master Information Block (MIB), transmitted at periodic interval and also from System Information (SI) for example. Thus, when the need arises the AP, if it is not in the cluster set, can be added into the cluster set without waiting for the next Sync channel (which may take up to 20 msec, depending on the periodicity of the Sync channel) for acquisition of the accessibility information and SI transmission from the AP. This is not applicable to APs in Unavailable-Suspended state. A UD is not able maintain up-to-date accessibility information of a suspended AP, because the UD cannot receive any signal from that AP. Thus, the above description applies to available APs; such as in either an Available-Not-selected state or an Available-Selected state.

With features as described herein, APs in the cluster set may be moved to a suspended state when they become unavailable. Thus, even if an AP is unavailable, because the AP is still in the cluster set, the network and the UD may preserve status information about the AP. With features as described herein, an AP in a suspended state may have resources allocated or assigned for the UD. With features as described herein, an AP which is in the suspended state for a long time, may be removed from the cluster set of the UD. With features as described herein, if a suspended AP becomes available again, it may be restored with full functionality. With features as described herein, the UD may keep up-to-date accessibility information of available APs, even though not being served by those APs.

UD CS Access Point States

Figure 6:
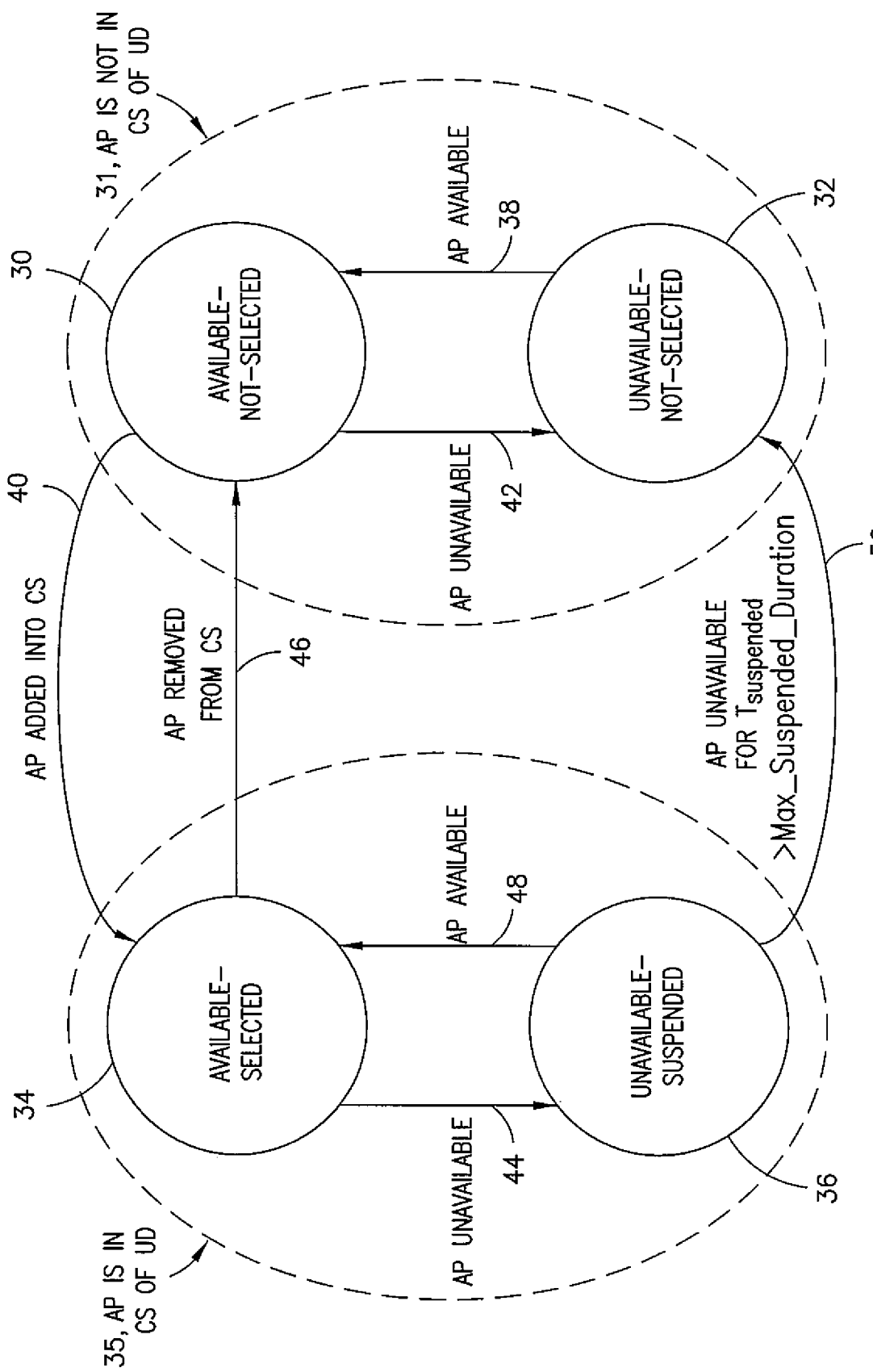
FIG. 6 is a diagram illustrating examples of availability states considered for an access point and transitions between accessibility states.

In FIG. 6 a diagram is shown as an example of some possible various states of an AP in the UD CS and the state transition events. In this example, four (4) states are shown: two states ("Available-Not-Selected" 30 and "Unavailable-Not Selected" 32) for an AP which is not in the cluster set (CS) of the UD (symbolized by area 31), and two states ("Available-Selected" 34 and "Unavailable-Suspended" 36) for an AP which is in the cluster set (CS) for the UD (symbolized by area 35). These states take into account the availability "status" of the AP and its membership in the cluster set of the UD. The details of the states and the transition events are described in the following.

State: Unavailable-Not-Selected 32

Description: An AP is considered to be in the "unavailable-Not-Selected" state if its "status" has been found to be unavailable and it is not in the cluster set of the UD.

Functional behaviour: The UD may or may not be monitoring the AP, depending on the requests from the network or its configurations.

State transitions: The possible transition from this state is, if the UD is monitoring the AP and the availability condition is met, the state of the AP is moved to the Available-Not-Selected state 30 as indicated by arrow 38.

State: Available-Not-Selected 30

Description: An AP is considered to be in the "available-Not-Selected" state if its status is available, but it is not a member of its cluster set.

Functional Behaviour:
  The UD is monitoring the AP and sends the AP measurement reports to the CSM, periodically or in an event-triggered manner, to aid the cluster set selection.
  The UD may acquire and save the latest accessibility information for the AP, which may consist of:
    The best beams to communicate with the AP
    System Information
    Downlink and uplink control channel configuration
State Transitions: The Possible Transitions from this State are:
  When the AP is added into the cluster set of the UD, it transitions to the Available-Selected state 34 as indicated by arrow 40;
  When the AP is blocked and fails to satisfy the availability condition, it transitions to the Unavailable-Not-Selected state 32 as indicated by arrow 42.

State: Available-Selected 34

Description: An AP is considered to be in the "available-Selected" state if the AP "status" is available to the UD and it has been included in its cluster set as shown by area 35.

Functional Behaviour:
  The UD is monitoring the AP and sends the AP measurement reports to the CSM, periodically or in an event-triggered manner to aid the cluster set selection for example.
  The UD acquires the accessibility information for the AP. For example, the accessibility information may consist of:
    The best beams to communicate with the AP
    System Information
    Downlink and uplink control channel configuration
  The UD may keep the CSM updated with some of the accessibility information periodically or in an event-triggered manner.
  The AP has assigned a DL control channel for UD to monitor. It may have also allocated an UL control channel or polling slot and monitors it for messages from the UD. The UD may use this UL channel for uplink access.
  The UD monitors the DL control channel of the AP assigned for it.
  The AP may be selected as the serving AP for the UD; if it is not the serving AP, the CSM may reroute the UD traffic via this AP during rapid rerouting procedure.
State Transitions: The Possible Transitions from this State are:
  When the AP is blocked and fails to satisfy the availability condition, it transitions to the Unavailable-Suspended state 36 as indicated by arrow 44.
  The AP may be removed from the cluster set as indicated by arrow 46. This may be due, for example, to finding an alternate AP with better connectivity, considering signal quality and/or load. Then, the AP moves to the Available-Not-Selected state 30. The allocated DL/UL control channel resources for the UD in the AP may be released.

State: Unavailable-Suspended 36

Description: An AP is considered to be in the "unavailable-suspended" state if the AP is unavailable to the UD although it is a member of its cluster set as indicated by area 35.

Functional Behaviours:
  The UD may monitor the AP and maintain the timer/counter $T_{detected}$ as per the availability determination criteria.
  On transition into this state the UD may start a timer/counter $T_{suspended}$ which is incremented each time the link of the AP is still unavailable.
  The AP and the UD may maintain the latest accessibility information before the link became unavailable.
  DL control channel assigned to the UD may remain assigned.
  The UL control channels allocated to the UD may remain allocated.
  The CSM, as soon as it is aware of the Unavailable-Suspended state of the AP, may suspend routing traffic for the UD via this AP.
  The UD may not perform any uplink access using the uplink access opportunities, such as the RACH or the UL polling channel, of this AP.

State Transitions: The Possible State Transitions from this State May Include:

When the availability condition is met, i.e. $T_{detected}$>Available_Threshold, the AP is moved to the Available-Selected state 34 as indicated by arrow 48. The UD stops the timer/counter $T_{suspended}$ and reports the latest accessibility information to the CSM.

When the timer/counter $T_{suspended}$ exceeds Max_Suspended_Duration, the AP is moved to the Unavailable-Not-Selected state 32 as indicated by arrow 50. The AP may be removed from the cluster set and allocated DL/UL control channel resources for the UD in the AP may be released.

The "suspended" state or "Unavailable-Suspended" state 36 of an AP indicates the availability status of the radio link between the UD and the AP which is in the cluster set of the UD. While an AP in the cluster set is suspended, the suspended AP may be excluded from performing the roles of a cluster AP for the UD as follows:

It cannot be considered by the CSM/network as a new serving AP candidate during rapid rerouting procedure.

The UD cannot perform uplink access via it.

In case it was acting as the serving AP for the UD just before being suspended, it ceases to be so (i.e. the CSM or the UD begins selection of a new serving AP).

The functional role of a suspended AP may be restored when its radio link to the UD is re-established (unless the AP has been removed from the cluster set of the UD due to prolonged unavailability).

Synchronization of Access Point States

As described earlier, the radio link status of an AP can be detected at the UD as well as the AP. Because of this, the state of an AP may be synchronized between the UD and the network in a fast and efficient way. The following are two examples:

Scenario 1—UD detects the status: In this scenario, the UD may use its earliest opportunity for uplink transmission to the CSM via the available APs in its cluster set. This can be either a RACH slot or an uplink polling channel for example.

Scenario 2—AP detects the status: In this scenario, the AP informs the CSM of the availability status. If the blocked AP is a stand-by AP, the CSM may inform the UD via the serving AP. If the blocked AP was the serving AP, the UD may inform the UD via a stand-by AP which the UD is monitoring.

The state of an AP is synchronized between the UD and the network. If the status of the AP (available or unavailable) is detected by the UD, the UD may use its earliest opportunity for uplink transmission to the CSM via the available APs in its cluster set. If the status of the AP (available or unavailable) is detected by the AP, the AP may inform the CSM of the availability status which in turn may inform the UD via one of the available APs in the cluster set.

In one example, the UD may maintain a cluster set and the UD may maintain the availability state of each AP in the cluster set such as:

UD suspends the AP when unavailable
UD restores the AP when again available
UD removes the AP from its cluster set when unavailable for extended period and may send a message to the CSM requesting it to remove the AP from the cluster set The UD may also communicate the availability state to the CSM.

The CSM may also maintain a cluster set, and the CSM may maintain the availability state of each AP in the cluster set such as:

CSM suspends AP when unavailable
CSM restores AP when again available
CSM removes AP from the cluster set when unavailable for extended period and may send a message to the UD requesting it to remove the AP from the cluster set The CSM may also communicate the availability status to the UD.

Figure 7:
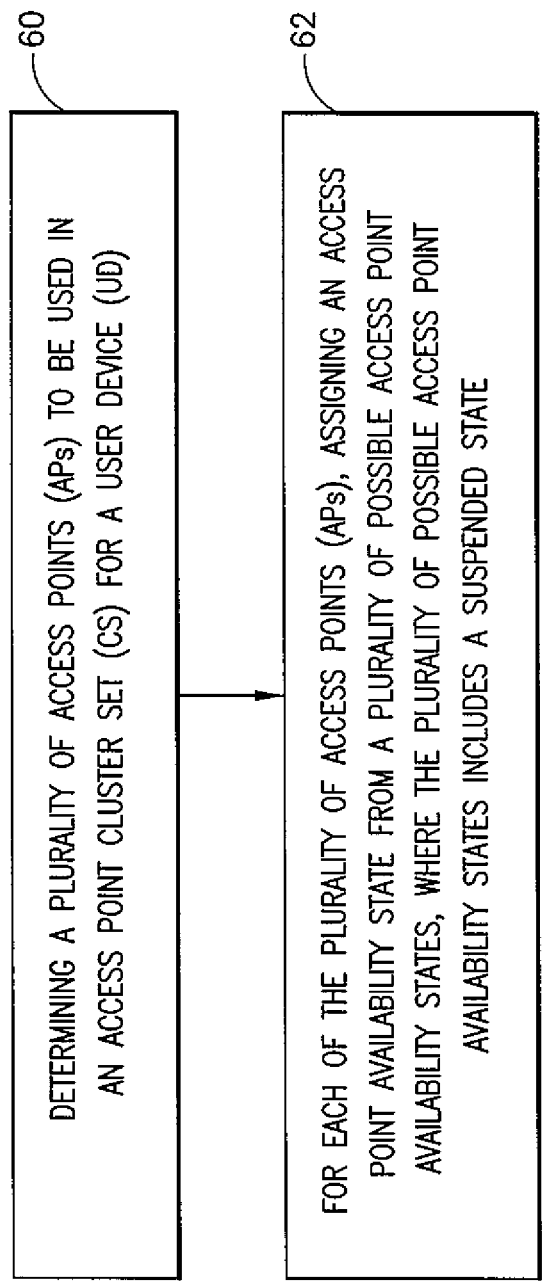
FIG. 7 is a diagram illustrating an example method.

Referring also to FIG. 7, an example method may comprise determining a plurality of access points (APs) to be used in an access point cluster set (CS) for a user device (UD) as indicated by block 60; and for at least one of the plurality of access points (APs), assigning an access point availability state from a plurality of possible access point availability states, where the plurality of possible access point availability states includes a suspended state as indicated by block 62. For step 62 the assigning of the access point availability state from the plurality of possible access point availability states may comprise assigning from (or selected between) at least one of a selected state and a suspended state.

An example method may comprise determining a plurality of access points (APs) to be used in an access point cluster set (CS) for a user device (UD); and for at least one of the plurality of access points (APs), assigning an access point availability state from a plurality of possible access point availability states, where the plurality of possible access point availability states includes a suspended state.

Assigning the access point availability state for the at least one access point (AP) may be accomplished by the user device (UD) and/or a cluster set manager (CSM). The suspended state may be assigned to an access point (AP) which is in the access point cluster set (CS) when an availability status of the access point (AP) relative to the user device (UD) is unavailable. The plurality of possible access point availability states may include a selected state, where the selected state may be assigned to an access point (AP) which is in the AP cluster set (CS) when an availability status of the access point (AP) relative to the user device (UD) is available. The method may further comprise the user device (UD) changing the access point availability state of an access point (AP) from a first access point availability state to a different second access point availability state comprising one of: a suspended state; and a selected state. The method may further comprise the user device (UD) removing an access point (AP) from the access point cluster set (CS) when an availability status of the AP is unavailable for a predetermined amount of time. The method may further comprise a cluster set manager (CSM) changing the access point availability state of an access point (AP) from a first access point availability state to a different second access point availability state comprising one of: a suspended state; and a selected state. The CSM may receive the availability status of the AP from the AP itself (when the AP detects the radio link status) or from the UD (when the UD detects the radio link status). Thus, a method may be provided for the CSM receiving the availability status of an AP in its cluster set and subsequently assigning an availability state to the AP based on the received availability status. The method may further comprise a cluster set manager (CSM) removing an access point (AP) from the access point cluster set (CS) when an availability status of the AP is unavailable for a predetermined amount of time. The method may further comprise adding an access point (AP) to the access point cluster set (CS) and subsequently assigning an access point availability state to the added access point (AP). The method may further comprise, when the access point availability state for one of the plurality of access points (APs) is assigned by the user device (UD), the user device (UD) transmitting a signal to a cluster set manager (CSM) indicating the assigned access point availability state; and when the access point availability state for one of the plurality of access points (APs) is assigned by a cluster set manager (CSM) of a network, the user device (UD) receiving a signal from the network indicating the assigned access point availability state. In examples, with the suspended state: radio frame resources in the AP allocated to the UD are not released; the AP cannot be used for rapid rerouting; and/or the AP cannot be used for uplink access by the UD. The user device (UD) may, at least partially, determine that the AP should be in the suspended state by at least one of: the AP has not been detected by the UD M times out of N observation periods, where M is a number less than or equal to N, and the AP has not been detected at least once in the last N observation periods. A method may be provided where the AP determines that its radio link to an UD is unavailable when one of the following occurs:

AP detects the radio link to the UD is blocked in M out of N observations, where M is less than or equal to N, and AP detects that its radio link to the UD is blocked in each of N observations, where N is greater than zero.

An example embodiment may be provided in an apparatus comprising at least one processor; and at least one non-transitory memory including computer program code, the at least one memory and the computer program code configured to, with the at least one processor, cause the apparatus to: determine a plurality of access points (APs) to be used in an access point cluster set (CS) for a user device (UD); and for each of the plurality of access points (APs), assign an access point availability state from a plurality of possible access point availability states, where the plurality of possible access point availability states include a suspended state.

The apparatus may comprise at least one of the user device (UD) and a cluster set manager (CSM) of a network. The at least one memory and the computer program code may be configured to, with the at least one processor, cause the apparatus to assigned the suspended state to an access point (AP) which is in the access point cluster set (CS) when an availability status of the access point (AP) relative to the user device (UD) is unavailable. The plurality of possible access point availability states may include a selected state, where the at least one memory and the computer program code configured to, with the at least one processor, cause the apparatus to assign the selected state to an access point (AP) which is in the access point cluster set (CS) when an availability status of the access point (AP) relative to the user device (UD) is available. The at least one memory and the computer program code may be configured to, with the at least one processor, cause the apparatus to change, by the user device (UD), the access point availability state of an access point (AP) from a first access point availability state to a different second access point availability state comprising one of: a suspended state; and a selected state. The at least one memory and the computer program code may be configured to, with the at least one processor, cause the apparatus to remove, by the user device (UD), an access point (AP) from the access point cluster set (CS) when an availability status of the AP is unavailable for a predetermined amount of time. The at least one memory and the computer program code may be configured to, with the at least one processor, cause the apparatus to change, by a cluster set manager (CSM), the access point availability state of an access point (AP) from a first access point availability state to a different second access point availability state comprising one of: a suspended state; and a selected state. The at least one memory and the computer program code may be configured to, with the at least one processor, cause the apparatus to remove, by a cluster set manager (CSM), an access point (AP) from the access point cluster set (CS) when an availability status of the AP is unavailable for a predetermined amount of time. The at least one memory and the computer program code may be configured to, with the at least one processor, cause the apparatus to add an access point (AP) to the access point cluster set (CS) and subsequently assign an access point availability state to the added access point (AP). The at least one memory and the computer program code are configured to, with the at least one processor, cause the apparatus to: when the apparatus is the user device, and when the access point availability state for one of the plurality of access points (APs) is assigned by the user device (UD), the user device (UD) transmitting a signal to a cluster set manager (CSM) indicating the assigned access point availability state; and when the apparatus is a cluster set manager (CSM) of a network, and when the access point availability state for one of the plurality of access points (APs) is assigned by the cluster set manager (CSM), the CSM receiving a signal from the user device (UD) indicating the assigned access point availability state. The suspended state may comprises at least one of: radio frame resources in the AP allocated to the UD are not released; the AP cannot be used for rapid rerouting; and/or the AP cannot be used for uplink access by the UD. The apparatus may be configured to at least partially determine that the AP should be in the suspended state by at least one of: the AP has not been detected by the UD M times out of N observation periods, where M is a number less than or equal to N, and the AP has not been detected at least once in the last N observation periods.

An example embodiment may be provided in a non-transitory program storage device, such as one or more of the memories shown in FIG. 3, readable by a machine, tangibly embodying a program of instructions executable by the machine for performing operations, the operations comprising: determining a plurality of access points (APs) to be used in an access point cluster set (CS) for a user device (UD); and for each of the plurality of access points (APs), assigning an access point availability state from a plurality of possible access point availability states, where the plurality of possible access point availability states include a suspended state. Any of the methods described above may be provided in the non-transitory program storage device, at least partially, as program(s) to be executed by the machine/apparatus.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

An example embodiment may be provided in an apparatus comprising means for determining a plurality of access points (APs) to be used in an access point cluster set (CS) for a user device (UD); and means for assigning an access point availability state, for at least one of the plurality of access point (AP), from a plurality of possible access point availability states, where the plurality of possible access point availability states includes a suspended state.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
    determining a plurality of access points to be used in an access point cluster set for a user device; and
    for at least one access point of the plurality of access points, assigning an access point availability state to the at least one access point putting the at least one access point into a suspended state of a plurality of possible access point availability states, comprising the at least one access point is temporarily put in the suspended state wherein in the suspended state the at least one access point cannot be used for rapid rerouting but radio frame resources allocated and assigned to the user device by the at least one access point are not released; and the at least one access point cannot be used for uplink access by the user device.

2. The method as in claim 1 where assigning the access point availability state for at least one access point of the plurality of access points is accomplished by at least one of the user device and a cluster set manager.

3. The method as in claim 1, where the suspended state is assigned to the at least one access point which is in the access point cluster set when an availability status of the at least one access point relative to the user device is unavailable.

4. The method as in claim 1, where the plurality of possible access point availability states comprises a selected state, where the selected state is assigned to the at least one access point which is in the access point cluster set when an availability status of the at least one access point relative to the user device is available.

5. The method as in claim 1, further comprising the user device changing the access point availability state of the at least one access point in the access point cluster set from a first access point availability state to a different second access point availability state, where the first and second states comprise one of: a suspended state; and a selected state.

6. An apparatus comprising:
    at least one processor; and
    at least one non-transitory memory including computer program code, the at least one memory and the computer program code configured to, with the at least one processor, cause the apparatus to:
    be used in an access point cluster set for a user device; and
    be assigned an access point availability state comprising a suspended state of a plurality of possible access point availability states, where the apparatus is temporarily put in the suspended state wherein in the suspended state the apparatus cannot be used for rapid rerouting but radio frame resources in the apparatus allocated and assigned to the user device by the apparatus are not released; and the apparatus cannot be used for uplink access by the user device.

7. An apparatus comprising:
    at least one processor; and
    at least one non-transitory memory including computer program code, the at least one memory and the computer program code configured to, with the at least one processor, cause the apparatus to:
    determine a plurality of access points to be used in an access point cluster set for a user device; and
    for at least one access point of the plurality of access points, assign an access point availability state to the at least one access point putting the at least one access point in a suspended state of a plurality of possible access point availability states, comprising the at least one access point is temporarily put in the suspended state wherein in the suspended state the at least one access point cannot be used for rapid rerouting but radio frame resources allocated and assigned to the user device by the at least one access point are not released; and the at least one access point cannot be used for uplink access by the user device.

8. An apparatus as in claim 7, where the apparatus comprises a cluster set manager of a network.

9. An apparatus as in claim 7, where the at least one memory and the computer program code are configured to, with the at least one processor, cause the apparatus to assign the suspended state to the at least one access point which is in the access point cluster set when an availability status of the at least one access point relative to the user device is unavailable.

10. An apparatus as in claim 7, where the plurality of possible access point availability states comprises a selected state, where the at least one memory and the computer program code configured to, with the at least one processor, cause the apparatus to assign the selected state to the at least one access point which is in the access point cluster set when an availability status of the at least one access point relative to the user device is available.

11. An apparatus as in claim 7, where the at least one memory and the computer program code are configured to, with the at least one processor, cause the apparatus to change, by the apparatus, the access point availability state of the at least one access point from a first access point availability state to a different second access point availability state, where the first and second states comprises comprising one of: a suspended state; and a selected state.

12. An apparatus as in claim 7, where the at least one memory and the computer program code are configured to, with the at least one processor, cause the apparatus, for the at least one access point in a suspended state, to remove, by the apparatus, the at least one access point from the access point cluster set when an availability status of the at least one access point is unavailable for a predetermined amount of time.

13. An apparatus as in claim 7, where the at least one memory and the computer program code are configured to, with the at least one processor, cause the apparatus to add an access point to the access point cluster set and subsequently assign an access point availability state to the added access point.

14. An apparatus as in claim 7, where the at least one memory and the computer program code are configured to, with the at least one processor, cause the apparatus to: when the apparatus comprises the user device, and when the access point availability state for the at least one of the plurality of access points is assigned by the user device, the user device transmitting a signal to a cluster set manager indicating the assigned access point availability state; and when the apparatus is a cluster set manager of a network, and when the access point availability state for one of the plurality of access points is assigned by the cluster set manager, the cluster set manager transmitting a signal to the user device indicating the assigned access point availability state.

15. An apparatus as in claim 7, where the at least one memory and the computer program code are configured to, with the at least one processor, cause the apparatus to: when a cluster set manager assigns an availability state for one of the plurality of access points, the cluster set manager transmitting a signal/message to a user device indicating the assigned access point availability state; and when the user device assigns an availability state to for one of the plurality of access points, the cluster set manager receiving a signal/message from the user device indicating the assigned access point availability state.

16. An apparatus as in claim 7, where the apparatus is configured to at least partially determine that the at least one access point should be in the suspended state by at least one of: the at least one access point has not been detected by the user device M times out of N observation periods, where N is a number, where M is a number less than or equal to N, and at least one access point has not been detected at least once in the last N observation periods.

17. An apparatus as in claim 7, where the apparatus comprises a user device and where the user device is configured to maintain up-to-date accessibility information for at least one access point of the plurality of access points in an available status which are not in the access point cluster set.

18. The apparatus as in claim 6, wherein the assigning an access point availability state is based on transient behavior of a propagation environment in a mmWave band wherein the apparatus is operating.

19. The apparatus as in claim 18, where the apparatus comprises an access point.

20. The apparatus as in claim 19, where the suspended state is assigned to the access point which is in the access point cluster set when an availability status of the access point relative to the user device is unavailable.

* * * * *

UNITED STATES PATENT AND TRADEMARK OFFICE
CERTIFICATE OF CORRECTION

| | | |
|---|---|---|
| PATENT NO. | : 10,959,170 B2 | Page 1 of 1 |
| APPLICATION NO. | : 15/768911 | |
| DATED | : October 23, 2018 | |
| INVENTOR(S) | : Hanns Juergen Schwarzbauer et al. | |

It is certified that error appears in the above-identified patent and that said Letters Patent is hereby corrected as shown below:

In the Claims

In Claim 11: Column 16, Line 56, delete "comprising"

Signed and Sealed this
Eighth Day of March, 2022

Drew Hirshfeld
*Performing the Functions and Duties of the
Under Secretary of Commerce for Intellectual Property and
Director of the United States Patent and Trademark Office*